G. MENIER.
MACHINE FOR MEASURING AND PACKAGING POWDERY MATERIALS.
APPLICATION FILED JUNE 17, 1913.
1,179,858.
Patented Apr. 18, 1916.
2 SHEETS—SHEET 1.
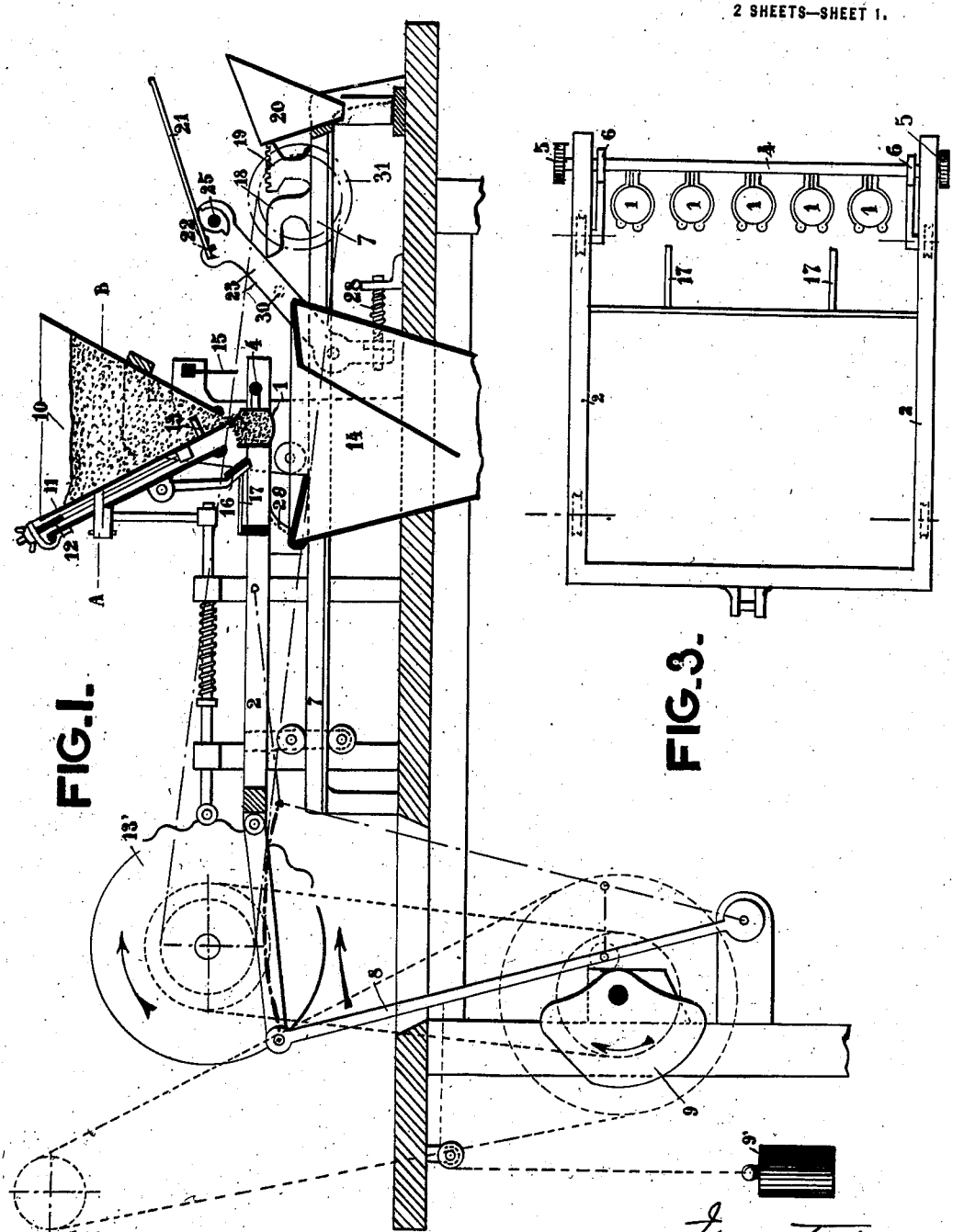

G. MENIER.
MACHINE FOR MEASURING AND PACKAGING POWDERY MATERIALS.
APPLICATION FILED JUNE 17, 1913.
1,179,858.
Patented Apr. 18, 1916.
2 SHEETS—SHEET 2.
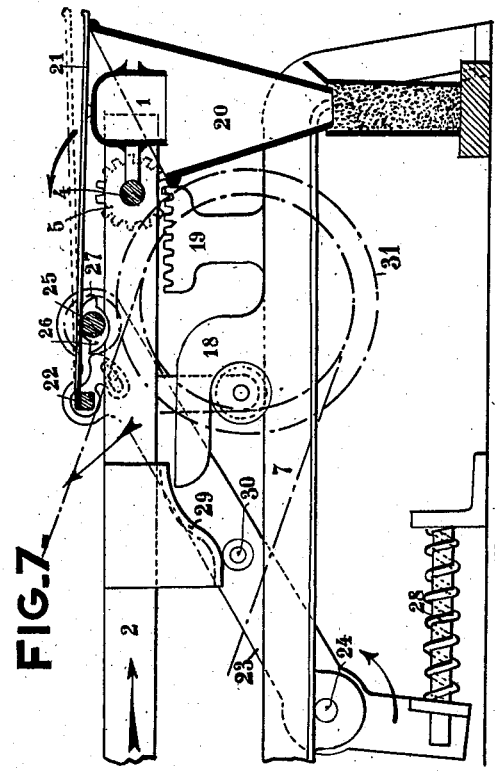
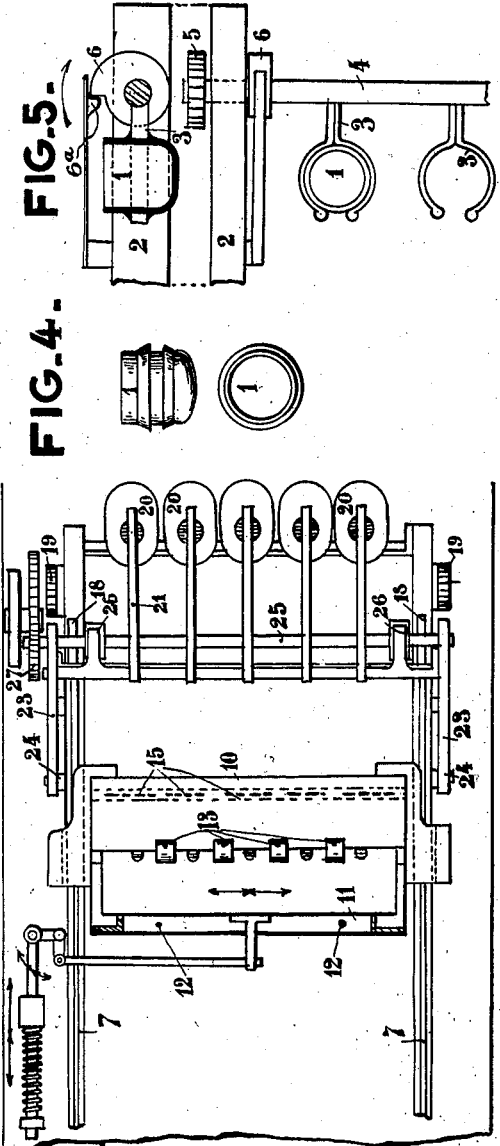

UNITED STATES PATENT OFFICE.

GASTON MENIER, OF PARIS, FRANCE.

MACHINE FOR MEASURING AND PACKAGING POWDERY MATERIALS.

1,179,858.   Specification of Letters Patent.   Patented Apr. 18, 1916.

Application filed June 17, 1913. Serial No. 774,246.

*To all whom it may concern:*

Be it known that I, GASTON MENIER, a citizen of the French Republic, residing at No. 56 Rue de Chateaudun, in Paris, France, have invented a new and useful Machine for Measuring and Packaging Powdery Materials, which is fully set forth in the following specification.

This invention has reference to a machine for measuring and packaging powdery materials and more particularly oily powdery materials for food, as for example, powdered chocolate. This machine based on volumetric principles is exempt from the inconveniences of the actual weighing machines, which do not give a weight sufficiently approximate, more particularly for small quantities. Furthermore its arrangement is such that whatever may be the tendency for the material to be measured to agglomerate and adhere together, it nevertheless moves easily along and does not stick to the walls of the various parts, such as distributing, measuring and packaging parts. Finally it permits of working with very great rapidity and of simultaneously effecting a great number of measurings and packagings which must be taken into consideration, more particularly when it has to do with a powdery material to be divided up into quantities of very small weight.

One embodiment of the invention is shown by way of example in the accompanying drawings, in which:—

Figure 1 is a vertical and longitudinal section showing the arrangement and the general working of the component parts of the machine. Fig. 2 is a partial plan with section along the line A—B of Fig. 1. Fig. 3 is the separate plan of the carriage and the measuring buckets provided thereon. Fig. 4 shows in elevation and plan one of these buckets. Fig. 5 shows in elevation and in plan the devices for mounting these measuring buckets and maintaining them in the filling position. Fig. 6 is a part vertical section showing one of the buckets while passing beneath a scraper for removing the excess of material supplied from a distributing hopper. Fig. 7 is another part vertical section showing the emptying of one of these measuring buckets into a funnel provided underneath with a small packing box.

The machine comprises a feed or distributing hopper 10, one or more measuring buckets or receptacles 1 and one or more receiving funnels 20. The hopper 10 has one or more discharge openings corresponding to the measuring receptacles, and the parts are so arranged that the buckets can register with the openings to receive material therethrough and be filled. After filling, the buckets or receptacles can be discharged respectively into the funnels 20. Preferably, relative horizontal movement is possible so as to bring the openings in the hopper and the measuring receptacle into and out of register with each other, the receptacles being filled when in register with the openings, and being discharged into the funnels when out of register with the openings. By preference the feed hopper and the receiving funnels are stationary, and the measuring receptacles are horizontally movable relatively to them. In the preferred embodiment of the invention this movement is a reciprocating one back and forth between the hopper and the funnels.

Referring to the preferred embodiment of the invention as shown in the drawings, the measuring buckets 1 are arranged in a line (Fig. 3) on a transporting carriage 2 mounted on rails. These buckets are of a volume corresponding to a given weight of given material. The buckets are preferably formed with tight bottoms and are discharged by being inverted. However, as concerns certain features of the invention, I do not limit myself to this construction. The buckets are preferably cylindrical (Fig. 4) with projecting circular ribs and inserted in spring clips 3 connected to a shaft 4 (Figs. 3 and 5) capable of turning on the transporting carriage 2. This shaft 4 is provided at its ends with toothed pinions 5, and with locking devices 6 which engage stops 6ª and maintain the buckets 1 in their filling position (Figs. 1, 3 and 5).

The transporting carriage, provided with rollers facilitating its movement along fixed rails 7, is connected to a lever 8 exposed to the action of a cam 9 intended to impart to the said transporting carriage the various necessary movements. A counter-weight 9' or any other suitable arrangement constantly tends to draw the transporting carriage backward.

The feeding hopper 10 is arranged above the transporting carriage and is so positioned that its feed opening registers vertically with the measuring buckets when they are in filling position. Means are provided for mechanically agitating the material in the hopper at points closely adjacent the feed opening to cause the material to flow freely through the opening. Preferably this agitation is effected by means of vibratory movements, but the invention, as concerns some of its features, is not limited in this respect. In the preferred construction one of the walls of the hopper 10 is provided with a plate 11 with transverse vibratory movement intended to stir up the material, the tendency of which is to agglomerate, and to facilitate its passage through the outlet of the hopper. The plate 11 is suspended by threaded rods 12 (Figs. 1 and 2) permitting of regulating as regards height the position of its lower edge which is suitably cut out to provide openings so that the material is gradually directed into the measuring buckets. Between these cut out or notched portions the plate 11 is provided with blades 13 intended, owing to the vibratory movement in which they participate, to prevent the formation of bridges which might occur in the material at the sides of each outlet.

The vibratory movement of the plate 11 can be effected by means of a rotary cam 13' and a suitable spring transmission (Figs. 1 and 2). The cam 13' is provided with an undulating surface along a part of its periphery, this undulating surface giving the required vibratory movement to the plate 11 during the filling period of the buckets. The cam is also provided, through the remainder of its periphery, with a smooth cylindrical surface which serves to interrupt the vibratory movements while the buckets are out of filling position. It will be seen that the buckets are overfilled, a natural heap being formed at the upper part of the buckets. The material in excess falls into an over-flow hopper or receptacle 14 from where it is again taken and poured into the hopper 10.

In front of the hopper 10 is situated a small bar or scraper 15 vertically adjustable and with a flexible lower border. When the filled buckets are carried along by the carriage 2 moved by the cam 9, this bar 15 scrapes across their upper portion (Fig. 6) thereby causing the material in excess to fall into the receptacle 14. In this manner the volumetric measurement is regulated and the buckets only carry along with them strictly measured quantities of material corresponding to a given weight. The error in weight has been found to be practically insignificant even for very small quantities of material. As soon as the buckets that have been filled leave the hopper a small shutter 16 is automatically applied beneath the latter to avoid any useless discharge of material, although there is not much danger of this owing to the stoppage of the vibratory movement of the plate 11. This shutter pivoted to the back of the hopper can be brought into the closing position (Fig. 6) by bars 17 carried by the carriage 2 (Fig. 3) or by any other means. The shutter 16 may if desired be dispensed with without thereby entailing any serious disadvantage. In any case the carriage with its measuring buckets continues to move forward until the moment at which its rollers 9' strike against stops 18, 18 fastened to the rails 7, 7. The cam 9 is so shaped that this must happen. It will be remarked, however, that the stops in question form elongated hooks running in horizontal direction and preventing the lifting up of the front of the carriage during the latter portion of its forward movement and that on the other hand the toothed pinions 5, 5 keyed to the bucket shaft 4 have engaged with the ratchets 19, 19 fastened to the rails 7, 7. It will also be seen that owing to this engagement the shaft 4 will be turned through half a revolution, thereby overturning the buckets (Fig. 7) arranged in line, so as to empty their contents into fixed funnels 20. If boxes, cases, packets or the like have been arranged beneath these funnels it will be seen that the substance or material measured thus precisely will be bagged or placed in boxes with the utmost rapidity. Finally in order that the entire contents of the buckets may be filled into boxes, bags or cases and in order to avoid small portions of the measured material sticking to the walls of the buckets and even of the funnels 20, flexible rods 21 knock against the buckets and funnels during the discharge of the said material. These rods are fitted to a bar 22 adjustably mounted on levers 23, 23 pivoted at 24 (Figs. 1, 2 and 7). Said levers have journaled in their free ends the shaft 25 parallel to the bar 22 and carrying cams 26 intended to act on the said rods 21 for the purpose of imparting to them a suitable vibratory movement. At one of its ends the shaft 25 has a toothed pinion 27 for the purpose hereinafter described. Until these buckets 1 have been overturned, the levers 23, 23 are retained in their raised positions (Fig. 1) by the action of springs 28 in which case the rods 21 are inactive. During the period in which the buckets are overturned a curved rail 29 or curved slope fastened to the sides of the carriage 2 encounters and presses a roller 30 carried by the levers 23 which are inclined forward (Fig. 7). The parts are so constructed and arranged that when the levers 23 are swung down the pinion 27 of the shaft 25 engages with a toothed wheel 31 provided on the side of the carriage and which is continuously rotated. This movement is then transmitted to the pinion 27 and consequently to the cam shaft 25, so as to impart a vibratory movement to the flexible rods 21, so that they strike simultaneously against the bottom of the buckets and the top of the funnels for the purpose of avoiding any possible adherence and of occasioning the discharge of all the material.

On the return of the carriage 2 backward occasioned by the cam 9 the inclined planes 29, 29 release the levers 23, 23, which are then raised up under the action of their springs. At the same time the pinions 5, 5 turn in opposite direction and thus bring back the buckets 1 into their filling positions (Fig. 5), and the shutter 16, if such is employed, leaves the outlet of the hopper free beneath which the said buckets pass to be filled again. Then the above-mentioned movements are uninterruptedly renewed until the stoppage of the cam shaft 9. It will be seen that when moving forward the carriage owing to the shape of the cam 9 can be stopped for a short time before turning over the buckets 1, so that the attendant of the machine can control the filling of the buckets.

It must be understood furthermore that the machine described above may be made of any dimensions and its transporting carriage may be provided with any number of buckets 1 and consequently of scrapers 15, funnels 20 and striking rods 21. This machine may also be provided for the control or coming into work of its component parts by means differing from those merely shown by way of example; thus the cams 9 and 13 as well as the transmission to the carriage and the movable wall of the hopper and the like can be substituted by other mechanical means which will in nowise affect the principle of the invention.

What is claimed is:—

1. The combination of a feed hopper having a bottom opening and adapted to contain unmeasured powdered dry material, a measuring receptacle registrable with the opening, means for agitating the material in the hopper adjacent the opening to cause it to feed freely therethrough to repeatedly fill the receptacle, a funnel adapted to receive measured batches of the material, means operable when the receptacle is filled for discharging it into the funnel, and means for automatically interrupting the action of the agitating means during the discharging of the receptacle.

2. The combination of a feed hopper having a bottom opening and adapted to contain unmeasured powdered dry material, a measuring receptacle registrable with the opening, means for effecting relative horizontal movements to bring the opening and the receptacle into and out of register with each other, means for agitating the material in the hopper adjacent the opening to cause it to feed freely therethrough to fill the receptacle, a funnel adapted to receive measured batches of the material, means acting automatically when the receptacle is filled and out of register with the opening to discharge it into the funnel, and means acting automatically to interrupt the action of the vibrating means when the receptacle is in discharging position.

3. The combination of a feed hopper having a bottom opening and adapted to contain unmeasured powdered dry material, a measuring receptacle registrable with the said opening, means for agitating the material in the hopper adjacent the opening to cause it to feed freely therethrough to fill the receptacle, a funnel adapted to receive measured batches of the material, means operable when the receptacle is filled to invert it to discharge it into the funnel, and means acting simultaneously with the inverting means for automatically interrupting the action of the agitating means.

4. The combination of a feed hopper having a bottom opening and adapted to contain unmeasured powdered dry material, a measuring receptacle adapted to register with the said opening, means for effecting relative horizontal movements to bring the opening and the receptacle into and out of register with each other, means for agitating the material in the hopper adjacent the opening to cause it to feed freely therethrough to fill the receptacle, a funnel adapted to receive measured batches of the material, means acting automatically when the receptacle is filled and out of register with the opening to invert it to discharge it into the funnel, and means acting automatically to interrupt the action of the vibrating means during the discharging of the receptacle.

5. The combination of a feed hopper having a bottom opening and adapted to contain unmeasured powdered dry material, a measuring receptacle registrable with the opening, means for vibrating a part of the hopper adjacent the opening to cause the material to feed freely through the opening to fill the receptacle, a funnel adapted to receive measured batches of the material, means operable when the receptacle is filled to discharge it into the funnel, and means for automatically interrupting the vibrating during the discharging of the receptacle.

6. The combination of a feed hopper having a bottom opening and adapted to contain unmeasured powdered dry material, a measuring receptacle movable horizontally into and out of register with the opening, a funnel adapted to receive measured batches of the material, and means comprising a stationary rack and a pinion connected with the horizontally movable receptacle for inverting it when filled and moved out of register with the opening to discharge it into the funnel.

7. The combination of a feed hopper having a rectilinear series of bottom openings and adapted to contain unmeasured powdered dry material, a rectilinear series of measuring receptacles registrable respectively with the openings to be filled therethrough, a reciprocating carrier for the receptacles comprising a frame, an oscillating shaft on the frame and spring clips secured to the shaft and yieldably engaging the receptacles, a recilinear series of funnels each adapted to receive measured batches of the material, and means operable when the receptacles are out of register with the openings for rocking the said sh: to discharge them into the respective fun:.

8. The combination of a feed hopper having a bottom opening and adapted to contain unmeasured powdered dry material, a measuring receptacle registrable with the opening to receive material therethrough, means adapted to receive measured batches of the material, means for repeatedly inverting the filled receptacle to discharge it into the said receiving means, and means operable while the receptacle is inverted for vibrating it.

9. The combination of a feed hopper having a bottom opening and adapted to contain unmeasured powdered dry material, a measuring receptacle registrable with the opening to receive material therethrough, means adapted to receive measured batches of the material, means for repeatedly inverting the filled receptacle to discharge it into the said receiving means, and means operable while the receptacle is inverted for vibrating it, the said means being automatically thrown into and out of action as the receptacle moves into and out of discharging position.

10. The combination of a feed hopper having a bottom opening and adapted to contain unmeasured powdered dry material, a measuring receptacle registrable with the opening to receive material therethrough, a funnel adapted to receive measured batches of the material, means for causing the discharge of the filled receptacle into the said funnel, and means operable during the discharging for vibrating the receptacle and the funnel.

11. The combination of a feed hopper having a bottom opening and adapted to contain unmeasured powdered dry material, a measuring receptacle registrable with the opening to receive material therethrough, a funnel adapted to receive measured batches of the material, means for causing the discharge of the filled receptacle into the said funnel, and means operable during the discharging for vibrating the receptacle and the funnel, the said means being automatically thrown into and out of action as the receptacle moves into and out of discharging position.

12. The combination of a feed hopper, a movable carriage, measuring devices rotatably mounted on said carriage, means for rotating said devices to discharge the contents thereof, and vibratory means striking against said measuring devices when discharging for preventing material adhering thereto.

13. The combination of a feed hopper, a reciprocating carriage, measuring devices mounted on said carriage, means for discharging the contents of said devices, and vibratory means striking against said measuring devices when discharging for preventing material adhering thereto.

14. The combination of a feed hopper, a movable carriage, measuring devices rotatably mounted on said carriage, means for rotating said devices at a predetermined point to discharge the contents thereof, funnels for receiving said discharged contents, and vibratory means striking against said measuring devices and funnels for preventing material adhering thereto.

15. The combination of a feed hopper, a movable carriage, measuring devices on said carriage, means for rotating said devices to discharge the contents thereof, vibratory means striking against said measuring devices when discharging for preventing material adhering thereto, and means for retaining said vibratory means inoperative when said measuring devices are being filled.

16. The combination of a feed hopper, a movable carriage, measuring devices on said carriage, means for rotating said devices to discharge the contents thereof, vibratory means striking against said measuring devices when discharging for preventing material adhering thereto, means for retaining said vibratory means inoperative when said measuring devices are being filled, and means carried by said carriage for moving said vibratory means into operative position.

17. The combination of a frame, a feed hopper arranged above said frame, a movable carriage mounted on said frame below said feed hopper, rotatable measuring devices mounted on said carriage, means for discharging the contents of said devices, and vibratory means striking against said measuring devices when discharging for preventing material adhering thereto.

18. The combination of a frame, a feed hopper arranged above said frame, a movable carriage mounted on said frame below said feed hopper, rotatable measuring devices mounted on said carriage, means for discharging the contents of said devices, funnels for receiving said discharged contents, and vibratory means striking against said measuring devices and funnels for preventing material adhering thereto.

19. The combination of a feed hopper, a reciprocating carriage, rotatable measuring devices for receiving material from said hopper at the beginning of the movement of said carriage in one direction, means for inverting said measuring devices at the end of the movement of the carriage in the aforesaid direction, and intermittently operated vibratory means for preventing material adhering to said devices when the same are inverted.

20. The combination of a feed hopper having a bottom opening and adapted to contain unmeasured powdered dry material, a measuring receptacle registrable with the opening, means for agitating the material in the hopper adjacent the opening to cause it to feed freely therethrough to fill the receptacle, a funnel adapted to receive measured batches of the material, means for discharging the filled receptacle into the funnel, means for vibrating the receptacle while it is being discharged, and devices acting automatically to stop the agitation of the material in the hopper during the discharging of the receptacle and to stop the agitation of the receptacle during filling.

In testimony whereof I have signed this specification in the presence of two subscribing witnesses.

GASTON MENIER.

Witnesses:
HANSON C. COXE,
JACOB H. BAKE.